No. 744,998. PATENTED NOV. 24, 1903.
T. BRUECK.
PHOTOGRAPHIC SHUTTER.
APPLICATION FILED FEB. 18, 1902.
MODEL. 4 SHEETS—SHEET 1.
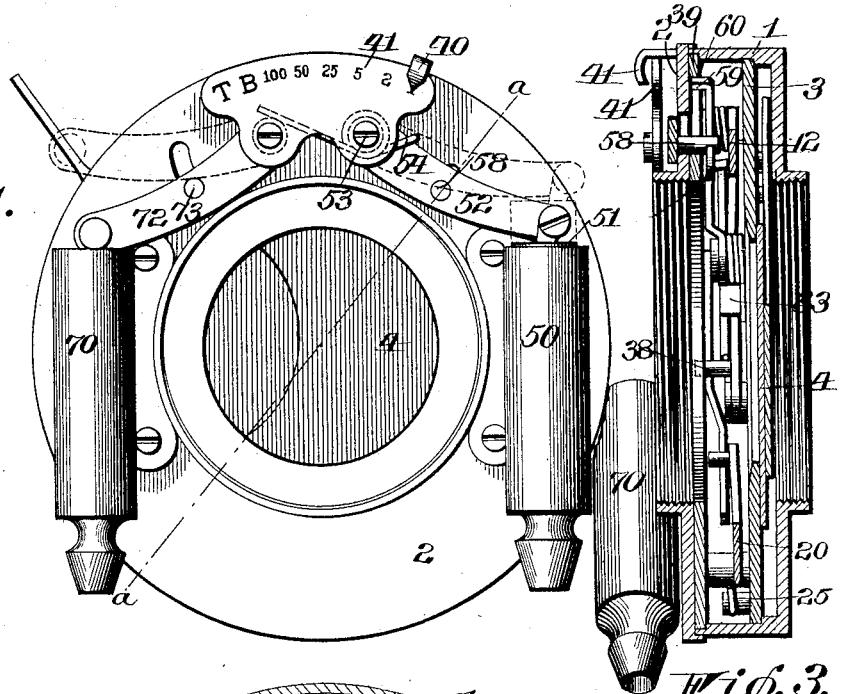
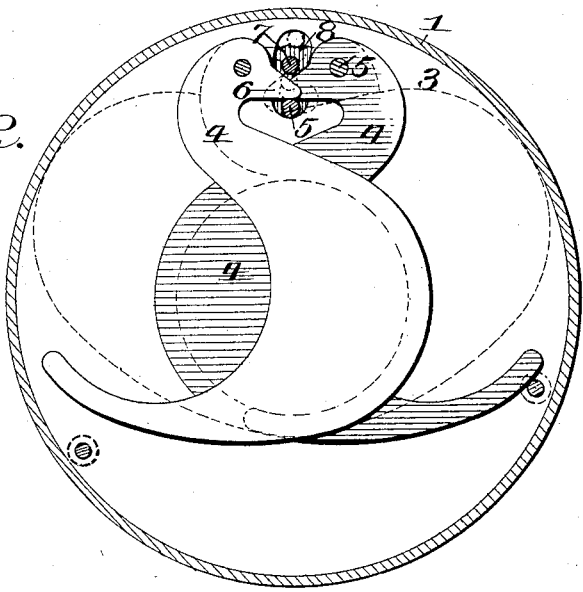
Witnesses. Inventor.
Walter B. Payne. Theodor Brueck
G. Willard Rich. by
Attorney

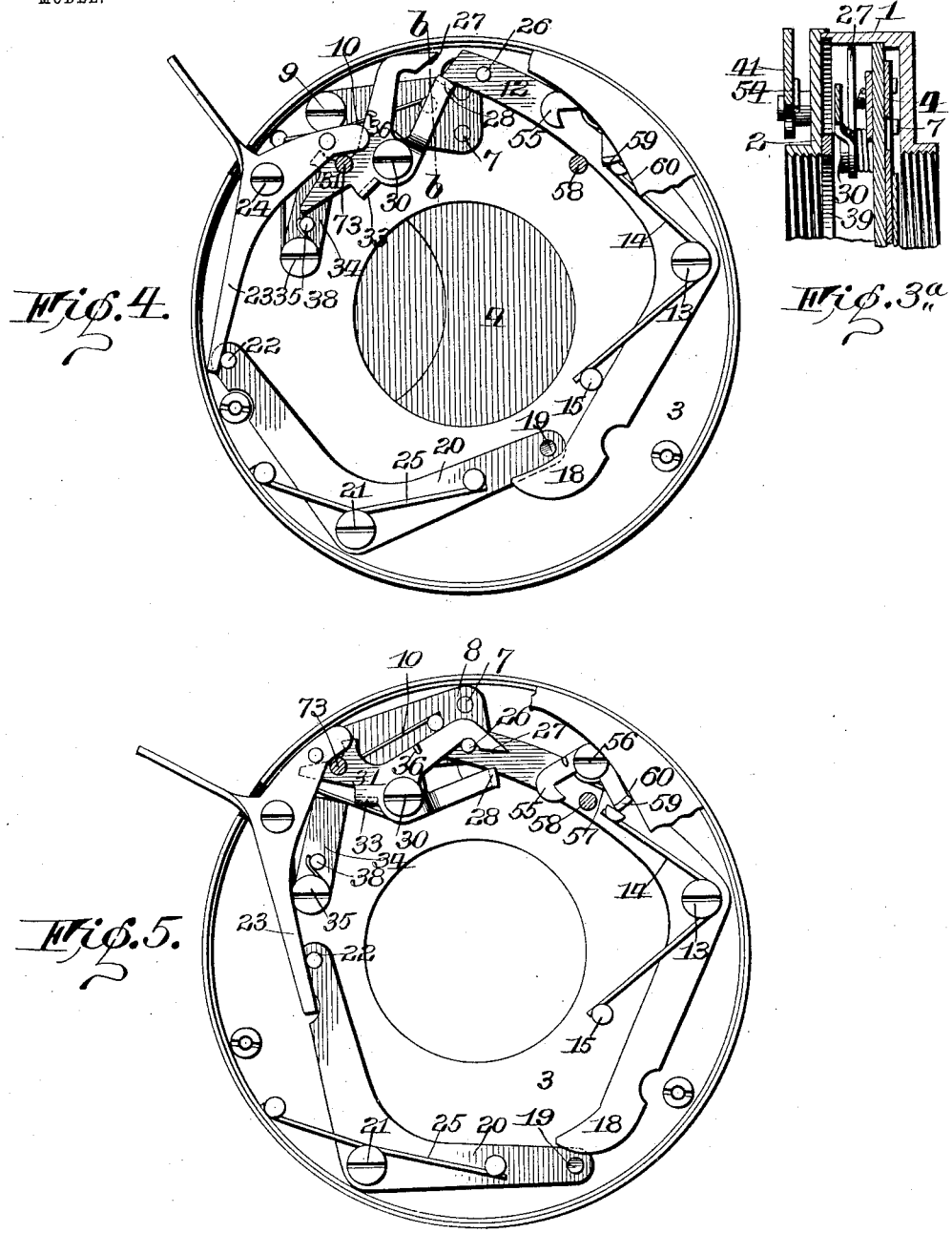

No. 744,998. PATENTED NOV. 24, 1903.
T. BRUECK.
PHOTOGRAPHIC SHUTTER.
APPLICATION FILED FEB. 18, 1902.
MODEL. 4 SHEETS—SHEET 3.

Witnesses. Inventor.

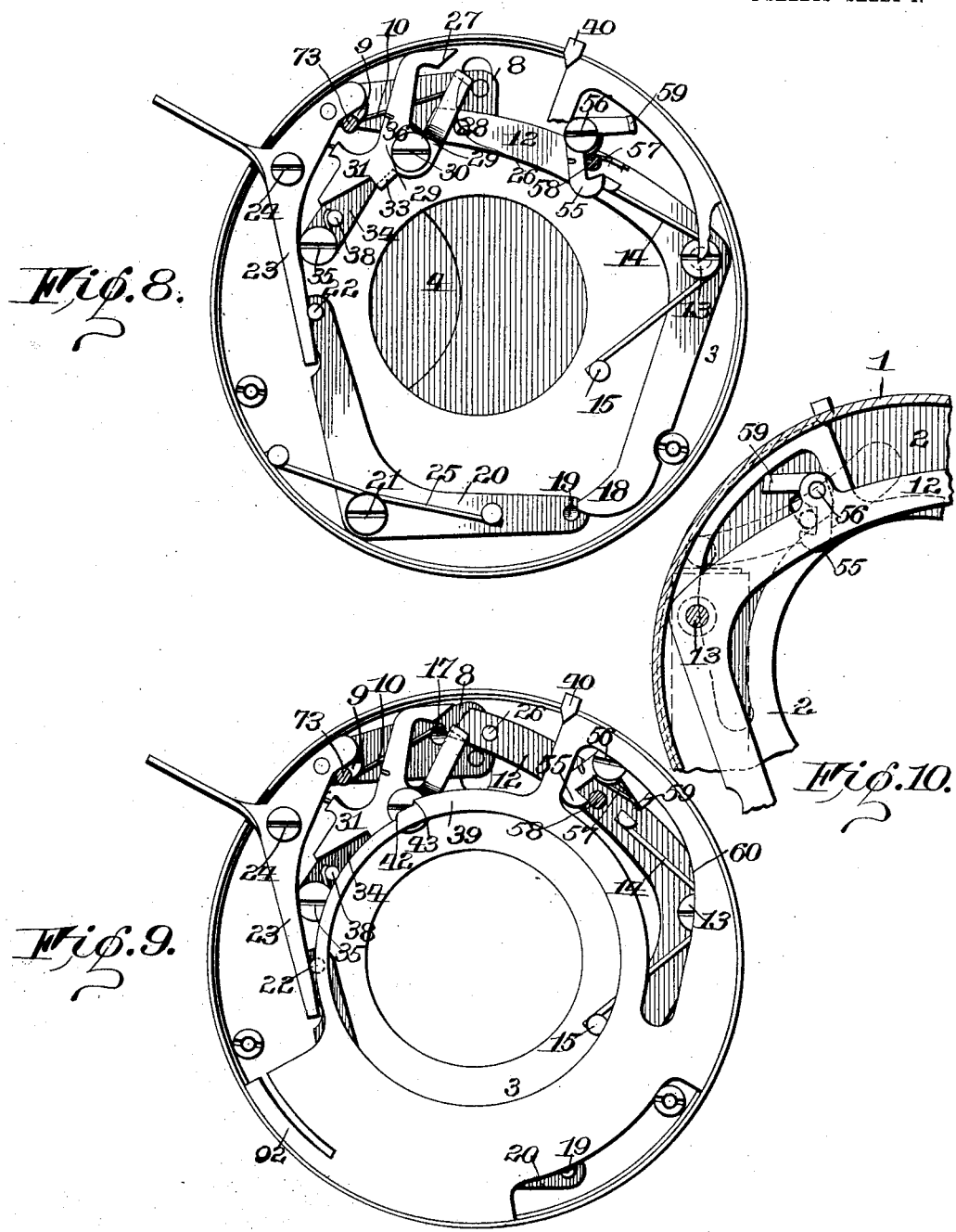

No. 744,998. Patented November 24, 1903.

UNITED STATES PATENT OFFICE.

THEODOR BRUECK, OF ROCHESTER, NEW YORK, ASSIGNOR TO BAUSCH & LOMB OPTICAL COMPANY, OF ROCHESTER, NEW YORK, A CORPORATION OF NEW YORK.

PHOTOGRAPHIC SHUTTER.

SPECIFICATION forming part of Letters Patent No. 744,998, dated November 24, 1903.

Application filed February 18, 1902. Serial No. 94,573. (Model.)

*To all whom it may concern:*

Be it known that I, THEODOR BRUECK, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to photographic shutters, particularly of the class capable of making time, bulb, instantaneous, and automatically-timed exposures; and it has for its object to provide a shutter in which the duration of automatically-timed exposures may be varied as desired and the construction and operation of the parts simplified.

The invention consists of certain improvements hereinafter described, the novel features being set forth particularly in the claims.

Figure 6:
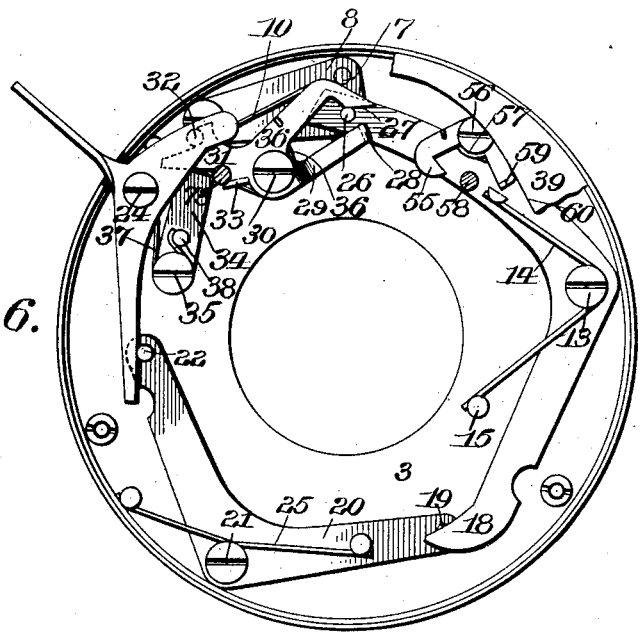
Figure 7:
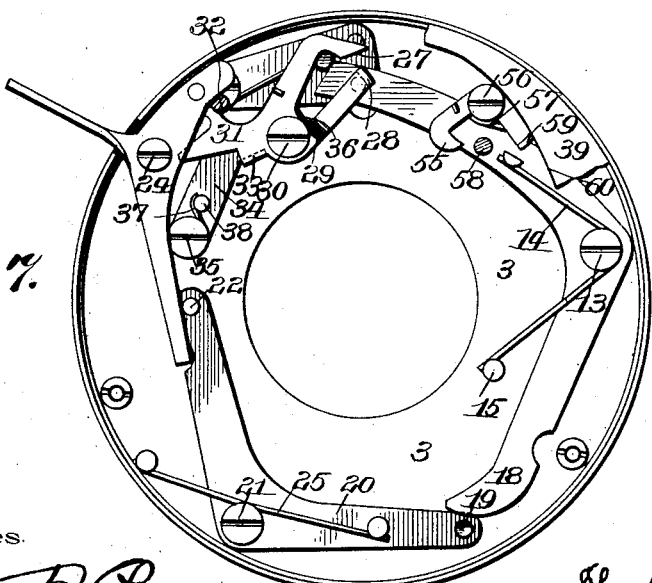

In the accompanying drawings, Figure 1 is a front elevation of a photographic shutter embodying my improvements. Fig. 2 is a sectional view looking from the rear and showing the shutter leaves or blades; Fig. 3, a sectional view on the line $a\ a$ of Fig. 1; Fig. 3ª, a sectional view on the line $b\ b$ of Fig. 4. Fig. 4 is a view of the operating parts with the front cover-plate removed with the parts set for making a time exposure. Fig. 5 is a similar view with the shutter open during a time exposure. Fig. 6 is a similar view showing the parts just before the shutter is closed during a time exposure; Fig. 7, a similar view showing the blades open during a bulb exposure. Figs. 8 and 9 are similar views showing the position of the parts when making an instantaneous or timed instantaneous exposure. Fig. 10 is a sectional view taken in rear of the master member looking toward the front and showing the relation of the master member and retarding device.

Similar reference-numerals in the several figures indicate similar parts.

The main casing of the shutter, to which my invention is shown applied, may be of any suitable construction, but preferably consists of an annular casing 1, embodying the back plate and the rim, to which latter is secured the removable front plate 2 and provided with an intermediate septum or supporting-plate 3, secured between the front and back plate in any suitable or usual manner.

4 indicates the shutter blades or leaves, pivoted at 5 to suitable pins and having the short projections 6, extending between pins or projections 7, located at the rear side of an exposure lever or member 8, pivoted at 9, upon the plate 3 and moved downwardly or toward the center of the shutter-casing by a spring 10 and which will normally hold the shutter leaves or blades closed, as shown in Fig. 2. Also arranged upon the exposure lever or member 10 is a pin or projection 11, with which is adapted to coöperate the end of a master member or lever 12, pivoted at 13 on the supporting-plate 3 and operated upon by a spring 14, coiled around its pivot, having one end engaging a projection 15 on the plate or support 3. One end 16 of the master-lever is inclined and is adapted to coöperate with a pin or projection 17 on the exposure-lever when moved outwardly by its spring to move the exposure-lever in a direction to open the shutter-blades and then, as the pivotal centers of said levers are different, the exposure-lever is released and allowed to return to normal position, closing the shutter again. The end of the pin 17 is beveled and the end of the master member slightly inclined, so that it may slide over the pin without operating it and return to normal position, as shown in Fig. 4. The pin and the end of the master member form a latch connection yielding laterally of the members or levers themselves.

The lower end 18 of the master-lever is also beveled or inclined slightly and is adapted to be engaged by a pin 19 on a lever 20, pivoted at 21, actuated by a spring 25 and having a pin or projection 22, engaged by an operating-lever 23, pivoted at 24. The pin 19 traverses an arc intersecting that traversed by the end 18, and its outer end is beveled similar to the pin 17 on the exposure-lever, so that when the pin is moved outward it will carry the master-lever and then will release it, the beveled end of the pin passing under said end 18 of the master-lever, which yields laterally without operating it.

Near the upper end of the master member is a pin or projection 26, with which the time and bulb stops coöperate to arrest said member to hold the shutter open. The time-stop embodies the beveled projection 27 and the bulb-stop a lug 28, arranged on the arms of a controlling member 29, pivoted at 30 and having a lug or projection 31 at its rear side adapted to coöperate with a projection 32 on the operating member 23 and also a lug or projection 33, adapted to coöperate with the end of a spring-actuated arm 34, pivoted at 35. The controlling member 29 is turned by a spring 36 to hold the lug 33 against the arm 34; but the spring 37, operating the latter, is the stronger. Therefore the position of the arm 34 governs that of the controlling member. The arm 34 is provided with a pin 38, normally held against the edge of a setting member 39 in the form of a ring plate arranged within the casing and adapted to be turned by an operating-finger 40, coöperating with a scale 41 on the casing, to bring the projections 42 and 43 into engagement therewith, the projection 42 moving the arm 34 far enough to allow the bulb-stop on the controlling member to engage the pin on the master member and make a bulb exposure and the projection 43 operating the controlling member far enough to allow the time-stop to engage said pin and, as will be understood, make a time exposure. The setting plate or member 39 fits within the annular casing and is guided in its movements thereby, and for the purpose of affording additional friction and preventing accidental movement it is split near a free end to form a more or less elastic or spring arm 92, which bears against the casing, as shown in Fig. 9.

In making bulb exposures the actuation of the operating-lever 23 will move the master member through the lever 20 and release it as described, allowing it to be caught by the projection 28, as shown in Fig. 7, and the release of the operating-lever will permit the spring 25 to return the operating-lever, and the pin 32 engaging the projection 31 will release the bulb-stop and allow the shutter to close.

In making a time exposure the arm 34 is at the extreme position (shown in Fig. 4) away from the lug 33 of the controlling member, and the first pressure on the operating-lever will actuate the master member and release it when the time-stop 27 will become engaged, as in Fig. 5, and when pressure on the operating member is released the parts will be in the position in Fig. 6, the engaging projections 31 and 32 forming part of the operating member and controlling member, a toggle which cannot be moved down preventing the complete movement of the controlling member to release the master member; but upon a second pressure on the operating member the projection 32 will be moved upwardly, the time-stop will be released from the master member, and the parts will return to the position in Fig. 4.

When making instantaneous exposure, the pin on the arm 34 is on the concentric portion 391 of the setting member 39 and controlling member is out of the path of the master member; but in order to control the latter to make automatic exposures of different duration I provide a retarding device connected to the master member or one of the operating parts by a latch connection, the duration of the engagement of the parts being capable of regulation. In carrying out this part of my invention in the present embodiment I provide upon the front of the casing a closed cylinder 50, in which operates a plunger or piston 51, pivotally connected to the end of a lever 52, pivoted at 53 and operated downwardly by a spring 54, the piston fitting the cylinder sufficiently accurately to permit the outward movement at a practically uniform speed when operated upon by the master member. The connection between the master member and the retarding device in the present arrangement consists of a pivoted latch 55, pivoted at 56 on the master member, having the hooked end beveled on the outer edge, as shown, and operated upon by a spring 57 to throw the engaging portion into the path of the pin or projection 58 on the lever 52. The latch is also provided with a projection 59, normally pressed into contact with the cam-surface 60 of the setting member 39, whereby the position of the engaging portion of the latch may be adjusted relatively to the pin 58 of the retarding device and its engagement therewith changed to vary the duration of the exposure.

When the setting member is moved to adjust the controlling device to make time or bulb exposure, the higher portion of the cam 60 holds the latch away from the pin 58, so that it will not engage the lever, as shown in Figs. 4 to 7, inclusive; but when said setting member is adjusted to the position shown in Figs. 8 and 9 the latch is free to move into the path of and to engage the pin 58 during the first or inward movement of the master member by the operating member, and during the outward movement of the master member when operating on the shutter it is connected to and its speed is controlled by the retarding device until the latch is released by having its engaging portion pass off the pin 58, and then the piston is returned to normal position by its spring, ready for the next operation. By adjusting the setting member the position of the latch may be varied, so that the engagement of the master member and retarding device will continue during nearly the entire movement of the master member, thereby making a long automatically-timed exposure, or it may be adjusted so it will only engage it and retard the movement for a very short time, making a short exposure, a trifle longer than that made by an absolutely free movement of the master member, and any adjustment to vary the length of time between the extremes may be accomplished.

The position of the latch and its plane of movement to release the master member relative to that of the latter are such that the friction and wear between the parts are slight and the movement of the master member can be accurately controlled.

The operating member may be moved by hand, if desired, the end projecting through the casing for this purpose; but I also provide an ordinary pneumatic engine having a cylinder 70, in which operates a piston connected to a pivoted lever 72, having a pin 73 passing through a slot in the casing and engaging beneath the operating-lever, as shown.

It will be understood that the particular form, number, or arrangement of blades or leaves employed in the shutter is immaterial and the term "blade" used in the claims is simply a generic term referring to a light-excluding medium of any desired construction.

I claim as my invention—

1. In a shutter, the combination with a shutter-blade, a movable master member for operating it and a retarding device for the latter, of a latch connection between the retarding device and master member causing their connection for movement when the master member is moved in one direction.

2. In a shutter, the combination with a shutter-blade, a movable master member for operating it and a retarding device for the latter, of a latch connection between the retarding device and master member for causing their connection when the master member is moved in one direction and their automatic disconnection when moved in the opposite direction.

3. In a shutter, the combination with a shutter-blade, a movable master member for operating it and a retarding device for the latter, of a latch connection between the retarding device and master member for causing their connection when the master member is moved in one direction and a stop coöperating with the latch to release the retarding device during its movement.

4. In a shutter, the combination with a shutter-blade, a movable master member for operating it and a retarding device for the latter, of a latch connection between the retarding device and master member for causing their connection when the master member is moved in one direction and an adjustable stop coöperating with the latch to release the retarding device during the movement in the opposite direction.

5. In a shutter, the combination with a shutter-blade, a movable master member for operating it and a retarding device for the latter having a movable member, of a movable connecting device carried by one of the members for engaging the other and a relatively stationary part engaging the connecting device to release it from one of the members.

6. In a shutter, the combination with a shutter-blade, a movable master member for operating it and a retarding device for the latter having a movable member, of a movable spring-operated connecting device carried by one of the members for engaging the other and a relatively stationary member for engaging the connecting device to release it from one of the members.

7. In a shutter, the combination with a shutter-blade, a movable master member for operating it, and a retarding device for the latter having a movable member, of a movable spring-operated connecting device carried by one of the members for engaging the other and a relatively stationary part or member engaged by the connecting device to release it from one of the members, said part or member being adjustable to vary the time of release relatively to the movement of said members.

8. In a shutter, the combination with a shutter-blade, a movable master member for operating it, and a retarding device for the latter having a movable member, of an engaging device pivoted on the master member and adapted to engage the movable member of the retarding device when moving in one direction and an adjustable plate for controlling the release of said device.

9. In a shutter, the combination with a shutter-blade, a movable master member for operating it, and a retarding device for the latter having a movable member, of a spring-operated latch pivoted on the master member and adapted to engage the movable member of the retarding device and the adjustable cam-plate for releasing the latch.

10. In a shutter, the combination with a shutter-blade, a spring-actuated master member for operating it, an operating member for actuating the master member, and a retarding device embodying a movable member, of a pivoted latch on the master member for engaging the retarding device during the operating movement of the master member and an adjustable releasing device for controlling the connection of the latch.

11. In a shutter, the combination with a shutter-blade, an exposure member, a spring-operated master member having a latch connection with the exposure member, an operating member, a lever actuated thereby and a latch connection between it and the master member, of adjustable time and bulb stops for controlling the master member and operated upon by the operating member.

12. In a shutter, the combination with a shutter-blade and a master member for operating it, of a spring-operated controlling member having time and bulb stops thereon coöperating with the master member, a spring-operated arm operating on the controlling member, a setting member operating on the arm to move it and an operating member acting upon the master member to actuate it in one direction and coöperating with the controlling member to release it.

13. In a shutter, the combination with a shutter-blade, a spring-operated master member having a latch connection therewith, an operating member, a latch connection between it and the master member, a controlling member coöperating with the master member and actuated by the operating member, of a retarding device embodying a movable member, a latch arranged between the said member of the retarding device and the master member and an adjustable setting member adapted to operate the controlling member and to govern the latch connection between the master and retarding members.

14. In a shutter, the combination with a shutter-blade, a master member, and devices for controlling the movement of the latter, of a retarding device having a movable member, a latch connection between it and the master member and a movable setting member operating upon the controlling devices and having the cam-surface coöperating with the latch to disconnect the master member and retarding device at different points in its movement.

15. In a shutter, the combination with the annular casing, a shutter-blade, means for operating and controlling it and a retarding device, of a setting member embodying the rotary annular plate fitting within the casing and having cam-surfaces thereon for varying the operation of the retarding device and adjusting the controlling devices.

16. In a shutter, the combination with the annular casing, a shutter-blade, means for operating and controlling it and a retarding device, of a setting member for adjusting the controlling and retarding devices composed of the annular plate fitting within the casing having the integral spring-finger engaging the latter and the cam-surfaces thereon.

THEODOR BRUECK.

Witnesses:
G. WILLARD RICH,
ELIZABETH J. PERRY.